W. J. HUNT.
SPARE TIRE HOLDER.
APPLICATION FILED MAY 17, 1920.
1,388,041.
Patented Aug. 16, 1921.
2 SHEETS—SHEET 1.
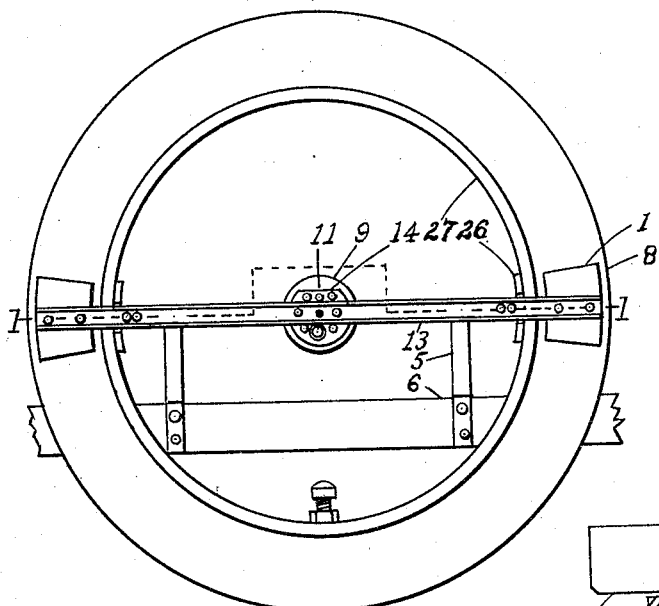
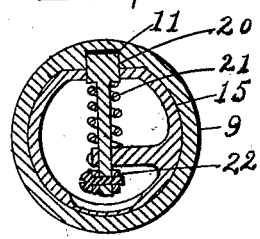
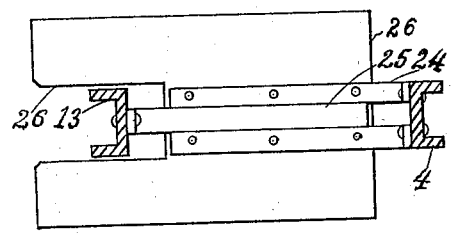
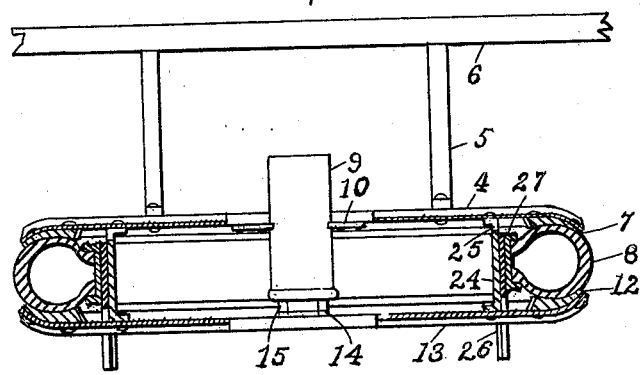
INVENTOR.
William J. Hunt.
BY
George W. Hinton.
ATTORNEY.

W. J. HUNT.
SPARE TIRE HOLDER.
APPLICATION FILED MAY 17, 1920.
1,388,041.
Patented Aug. 16, 1921.
2 SHEETS—SHEET 2.
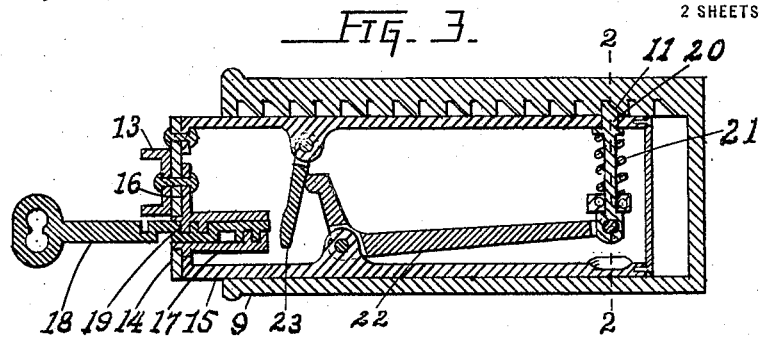
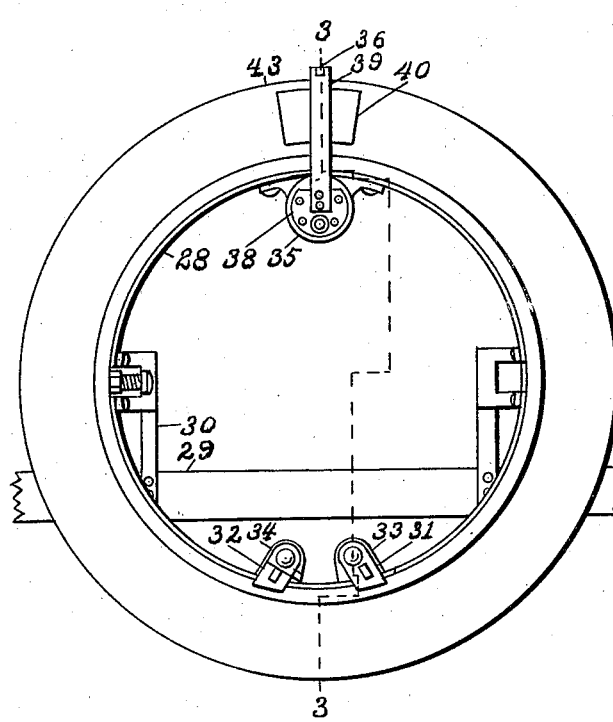
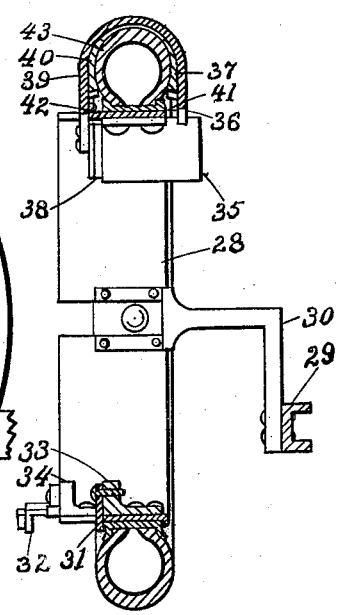
WITNESSES:
INVENTOR.
William J. Hunt.
BY George W. Hinton
ATTORNEY.

UNITED STATES PATENT OFFICE.

WILLIAM J. HUNT, OF ST. JOSEPH, MISSOURI.

SPARE-TIRE HOLDER.

1,388,041.  Specification of Letters Patent.  Patented Aug. 16, 1921.

Application filed May 17, 1920. Serial No. 381,909.

*To all whom it may concern:*

Be it known that I, WILLIAM J. HUNT, a citizen of the United States, residing at St. Joseph, in the county of Buchanan and State of Missouri, have invented certain new and useful Improvements in Spare-Tire Holders, of which the following is a specification, reference being had therein to the accompanying drawings.

My invention relates to improvements in spare tire holders, for holding the spare tires of a vehicle, such as an automobile, truck and the like, and the objects of my improvements are, first: to provide a holder of this class whereby the spare tires of a vehicle are held thereon in such manner that practically, they can not be removed from said tire holder by a thief or other unauthorized person, second: to so construct a tire holder and locking means therefor, that tires can be placed therein and be securely locked against removal therefrom, in the minimum amount of time, with ease and facility, and can as easily and quickly be unlocked and the tire holding members be separated for the removal therefrom of the tires, third: to so construct a spare tire holder that it shall be neat in appearance, extremely substantial and cheap in cost of manufacture.

I attain these objects by the mechanism illustrated in the accompanying drawings, in which:

Figure 1 is a front view of the preferred form of the tire holder, with a tire held therein. Fig. 2 is a horizontal section, on the line 1 1, seen in Fig. 1, looking downward. Fig. 3 is an enlarged longitudinal section in detail, of the locking means, cut vertically through the center, looking toward the left. Fig. 4 is a transverse section of the locking means, on the line 2 2, seen in Fig. 3, looking toward the right. Fig. 5 is an enlarged inside view in detail, of one of the rim holders. Fig. 6 is a front view of one of the other various forms, in which the tire holder may be made. Fig. 7 is a section cut transversely through the tire and rim holder on the line 3 3, seen in Fig. 6.

Referring to Fig. 2, the two-piece rear bar 4, is secured by the brackets 5 to the transverse tie bar 6 of an automobile frame; but a portion of said tie bar being shown. Said brackets may be of any form and proportions for securing said rear bar to any desired part of a vehicle. A rear tire clamp 7 is secured on each end of said bar, the contacting surfaces of which are formed to fit portions of one side of the tire 8. The lock case 9, which is of cylindrical form, is provided with the flanges 10, formed therewith, which flanges are secured on the inner ends of the pieces of said two-piece bar.

Referring to Fig. 3, the ratchet teeth 11 are formed in the inner surface of the upper side of the lock case.

A front tire clamp 12 (see Fig. 2,) is secured on each end of the front clamp bar 13, which clamps are of the same form as the previously described rear clamps, for clamping portions of a tire between them. The lock cover 14 (see Fig. 3,) is secured on the front end of the lock chamber 15. The flange 16 is formed on the ward chamber 17, which flange, said lock cover and the center of said front clamp bar are secured together. The front end of said ward chamber extends through an aperture formed through said lock cover, for admission of the push key 18 into said ward chamber. Since the wards 19, in said chamber may be of any well known construction, for the admission therepast of said key, and form no original element of this invention, they are neither shown nor described in detail. The lock bolt 20 is slidably mounted in the rear end portion of said lock chamber and is provided with the helical spring 21, mounted thereon, for yieldably moving said bolt into engagement with the ratchet teeth 11. The L crank 22 is oscillatably mounted in the lock chamber 15, the rear end of said L crank being pivotally connected with the inner end of said lock bolt. One end of the lever 23 is pivotally mounted in said lock chamber, the other end of said lever being extended beneath the ward chamber 17, while its intermediate portion rests against the front end of said L crank, the free end of said lever is adapted to be moved backward by the inner end of the push-key 18, when said key is inserted in said ward chamber, to the limit of its inward movement, for disengaging the lock bolt 20 from the teeth 11.

Referring to Fig. 5, one end of each one of the two outer-lapped guard fingers 24 are secured on the rear clamp bar 4, while one end of the inner-lapped guard finger 25 is secured on the front bar 13, the last mentioned finger being slidable between the first mentioned fingers, for preventing the removal of a deflated tire 8 (see Fig. 2,) from the described tire holder. The rim holder 26 is secured on the guard fingers 24 for holding the demountable rim 27 in place, as seen in Figs. 1 and 2.

In operation, with the parts in the position shown, the operator of the described tire holder, oscillates and inwardly moves the key 19, until its inner end has moved the free end of the lever 23, and said key has reached the limit of its inward movement, thereby moving the front end of the L crank 22, backward, which moves the rear end of said crank downward. This downward movement of the rear end of said L crank, by pivotal connection of said crank with the lock bolt 20, similarly moves said bolt, overcoming the spring 21 and moving the upper end of said bolt from engagement with the teeth 11. At this juncture said key is held in its inward position by the wards 19, thereby holding said lock bolt in its disengaged position. While the locking parts are thus held, the operator grasps the front bar 13 and removes the same from the position shown; thereby withdrawing the lock chamber 15 from the lock case 9, and removing the tire clamps 12 from the tire 8, after which he lays said clamp bar and the therewith connected parts aside.

He then removes the tire and the therewith connected rim from the tire holder, for use of the same.

While the parts of the tire holder are in their described position, he places another tire and its therewith connected rim in the position shown, supported by the rim supports 26. He thereafter places still another tire and its rim, in position against the previously mentioned other tire. He then grasps the front bar 4, and thereby inserts the rear end of the lock chamber 15 into the open front end of the lock case 9.

He also guides the free ends of the fingers 25 between their respective fingers 24, see Fig. 5. He then removes the key 18, thereby releasing the lock bolt 20, which bolt is moved into engagement with the teeth 11, by action of the spring 21.

He then forcibly moves the front bar 13 toward the rear bar 4, thereby compressing the said other tires between the clamps 7 and 12.

During the rearward movement of said front bar and the therewith connected parts, including the locking mechanism, seen in Fig. 3, the upper end of the bolt 20 is moved over the ratchet teeth 11, until said tires are fully compressed, which limits the inward movement of said parts. At this juncture the engaging end of said bolt is moved into engagement with the adjacent ratchet teeth 11, by the spring 22, thereby locking the parts in their last described position.

While I have shown and described my invention in the foregoing manner, it is evident that the tire holder could be made in various other forms, without departing from the spirit of my invention, which I reserve the right to do; one of such other forms being shown in Figs. 6 and 7, in which the annular rim support 28 is securely mounted on the transverse tie bar 29, of the frame of an automobile, (but a portion of said bar being shown,) by the brackets 30.

The buttons 31 and 32 are oscillatably mounted on their respective brackets 33 and 34, which brackets are secured on the inner surface of the lower portion of said rim support.

The lock case 35 is secured on said inner surface of the upper portion of said rim support. The rear clamp bar 36 is formed with said lock case, on which rear bar the rear clamp 37 is secured. The lock chamber 38 is slidably mounted in said lock case; and since the locking mechanism in said chamber and case are the same in construction and operation, as the previously described locking mechanism, said mechanism is neither shown nor described.

The front clamp bar 39 is secured on the front end of the lock chamber 38 and extends thereabove. The front clamp 40 is secured on said front bar.

The pair of guard fingers 41 are secured on the rear bar 36, between which fingers, the finger 42 is slidable; the last mentioned finger being secured on the front bar 39, for preventing the removal from said tire holder of a tire 43, after said tire has been deflated.

In the operation of this form of tire holder, the buttons 31 and 32 are oscillated from over the rim 28, after which practically the described operations of removing and replacing a tire, are performed. The button 31 is oscillated from the described position, to the position shown, for holding the rim 44 in position at its lower portion. When another tire is placed in position against the tire 43, the lower portion of its rim is similarly secured in place by the button 32.

Having fully described my invention, what I claim as new and desire to secure by Letters Patent, is:—

1. A spare tire holder comprising a pair of spaced bars extending diametrically one to either side of a tire, clamp members carried at the opposite ends of the bars and engaging the opposite sides of the tire, a hollow lock casing open at one end carried medially of one of said bars, and a locking mechanism carried medially of the other of said bars and adapted for insertion into said locking casing for locking said bars together.

2. A spare tire holder comprising a fixed bar and a removable bar extending parallel with the fixed bar in spaced relation thereto, guide members carried at the opposite ends of said bars and adapted to engage the inner side of a tire at points diametrically thereof, clamp shoes carried by said bars and adapted to engage the opposite sides of said tire, a lock casing carried medially of said fixed bar, and a locking mechanism carried medially of said removable bar and adapted for engagement with said lock casing for locking said bars together.

3. A spare tire holder comprising a fixed bar disposed in parallel relation to one wall of the body of an automobile, a removable bar extending parallel to the fixed bar in spaced relation thereto, clamp members carried at the opposite ends of said bars and adapted to engage the opposite sides of a tire at points diametrically thereof, a hollow lock casing open at its outer end carried medially of said fixed bar, a locking mechanism carried medially of said removable bar and adapted for insertion into said lock casing, and means for adjusting said locking mechanism within said lock casing whereby more than one tire may be secured in position between said bars.

4. A spare tire holder comprising a fixed bar secured in horizontal and parallel relation to one wall of the body of an automobile, a removable bar extending parallel to the fixed bar in spaced relation thereto, clamp members carried at the opposite ends of said bars and adapted to engage the opposite sides of a tire at points diametrically thereof, guide members connecting said bar at points inwardly of the opposite ends thereof and in close proximity to the inner wall of the tire, a cylindrical lock casing carried medially of said fixed bar, a locking mechanism carried medially of said removable bar and adapted for engagement within said lock casing, and means for adjusting said locking mechanism inwardly and outwardly of said casing whereby to space said bars apart for the clamping therebetween of one or more of the spare tires to be carried one concentrically of the other in the holder.

5. A spare tire holder comprising a fixed bar secured in horizontal and parallel relation to one wall of the body of an automobile, a removable bar extending parallel to the fixed bar in spaced relation thereto, clamp members carried at the opposite ends of said bars and adapted to engage the opposite sides of a tire at points diametrically thereof, a cylindrical lock casing carried medially of said fixed bar, a locking mechanism carried medially of said removable bar and adapted for engagement with said lock casing, means for adjusting said lock mechanism inwardly and outwardly of said casing whereby to space said bars apart for the clamping therebetween of one or more of the spare tires to be carried in the holder, and means extending between said bars inwardly from the opposite ends thereof for engaging the inner faces of the rim carried on the tire to prevent lateral displacement of the latter in case of deflation thereof for its unauthorized removal.

6. A spare tire holder comprising a fixed bar extending horizontally of the mean diameter of a tire, a removable bar extending parallel to said fixed bar in the opposite sides of the tire, clamp screws carried at the opposite ends of said bars and engaging the opposite sides of the tire, a cylindrical lock casing carried medially of said fixed bar, a locking mechanism carried medially of said removable bar and adapted for engagement with said lock casing, said locking mechanism having free inward movement of said lock casing for the spacing of the clamp screws thereof for proper engagement of one or more tires to be carried in the holder, and pairs of interengaging members carried by said bars inwardly from the opposite ends thereof for engaging the inner surface of the rim or rims carried by the tire or tires, whereby to prevent lateral displacement of the same in case of deflation of the tire or tires for its or their unauthorized removal.

In testimony whereof I affix my signature.

WILLIAM J. HUNT.